July 20, 1954 R. ANNEN 2,684,272
FLUID SUPPORT BEARING
Filed June 1, 1951 2 Sheets-Sheet 1
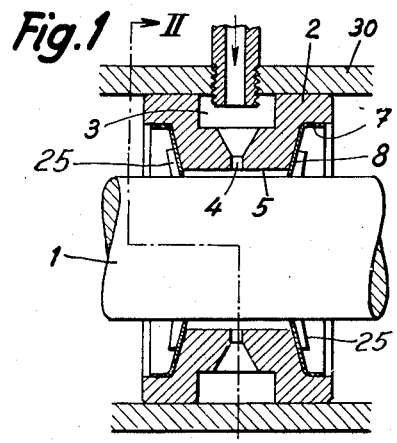
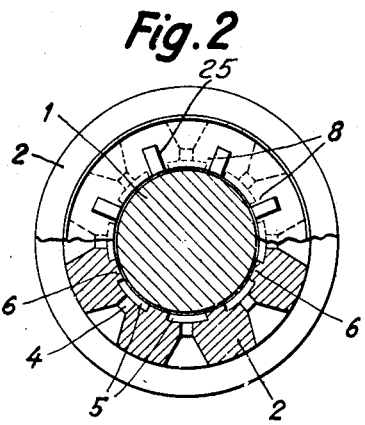
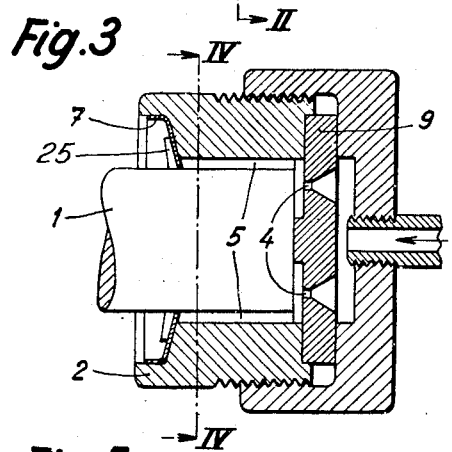
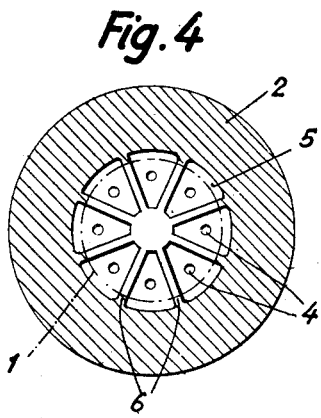
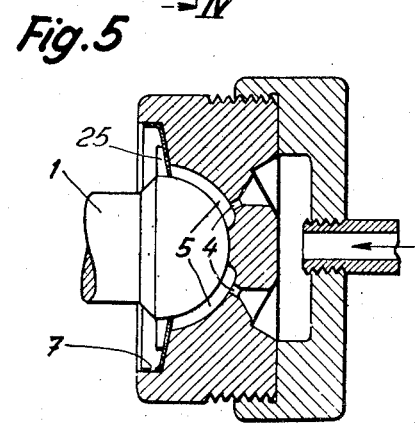
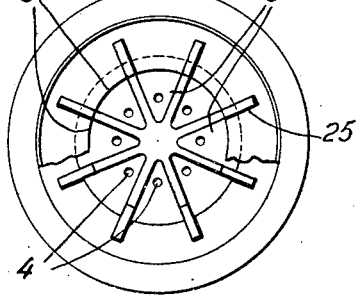
INVENTOR
ROBERT ANNEN July 20, 1954  R. ANNEN  2,684,272
FLUID SUPPORT BEARING
Filed June 1, 1951  2 Sheets-Sheet 2
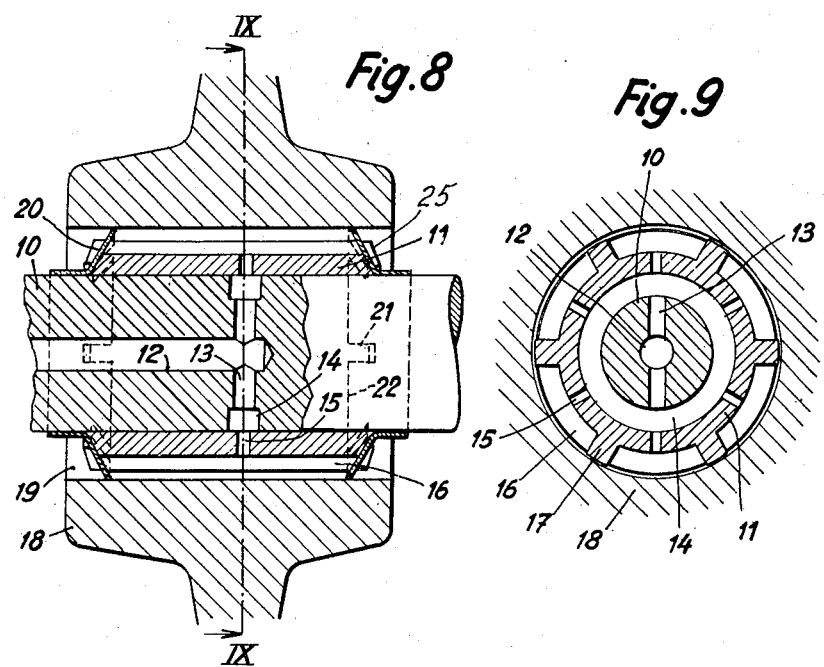
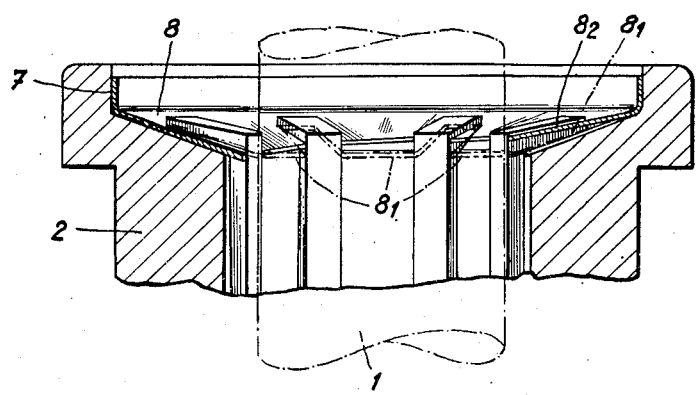
INVENTOR
ROBERT ANNEN

Patented July 20, 1954

2,684,272

UNITED STATES PATENT OFFICE 2,684,272

FLUID SUPPORT BEARING

Robert Annen, Bienne, Switzerland, assignor to Roulements à Billes Miniatures S. A., Bienne, Switzerland, a joint-stock company Application June 1, 1951, Serial No. 229,409

Claims priority, application Switzerland April 9, 1951

8 Claims. (Cl. 308—9)

This invention relates to bearings, and more particularly to bearings of the kind wherein the movable body is supported by a fluid.

It is an object of the invention to provide a bearing of the fluid supported type wherein the automatic centering of the movable body is materially improved.

Other objects, and the manner in which the same are attained, will become apparent as this specification proceeds.

There already exist several types of bearings wherein the movable body is supported by a fluid.

In order that these bearings function satisfactorily, it is necessary that when a radial force, for example, tends to displace the movable body relative to the bearing, the discharge of fluid through the outlet ports provided at the end of the bearing, proceeds sufficiently rapidly to reduce instantaneously the pressure in the pressure chambers located in the zone where the force originated, and to increase it correspondingly in the chambers located in the opposite zone. Thus an immediate, automatic centering of the body in the bearing is obtained.

The rate at which following a disturbance, the equilibrium of the pressures can be restored depends on the performance of the fluid discharge system.

Taking this condition into account, the present invention contemplates to provide a fluid support bearing wherein the fluid is discharged through outlets arranged at the axial extremities of the pressure chambers, the effective area of these openings being varied in accordance with the fluid pressures in the various chambers.

In the drawing affixed to this specification and forming part thereof, several embodiments of the invention are illustrated diagrammatically by way of example.

In the drawing,

Fig. 1 is a longitudinal section through a horizontal bearing;

Fig. 2, in the upper half, is a plan view and in the lower half, is a section along line II—II, of the embodiment of Fig. 1;

Fig. 3 is a longitudinal section of a thrust bearing;

Fig. 4 is a section along line IV—IV in Fig. 3, with the shaft omitted for clarity;

Fig. 5 is a longitudinal section of a swivel bearing;

Fig. 6 is a plan view of the bearing of Fig. 5, with the shaft omitted for clarity;

Fig. 7 shows, partly in side view and partly in longitudinal section, a fluid support bearing according to the invention, on an enlarged scale so as to better illustrate the function of the tongues of the spring closure.

Fig. 8 shows, in longitudinal section, a horizontal bearing of the type wherein the shaft is fixed and the bearing movable; and Fig. 9 is a section along line IX—IX in Fig. 8.

Referring now to the drawing wherein like elements are indicated by identical reference numerals, and first to Fig. 1, this shows a shaft 1 arranged for rotation in the bearing 2. This bearing is mounted in a support not shown in the drawing except for a wall 30. Between this wall and the bearing 2 is arranged the circular chamber 3 from which fluid is supplied through the injection nozzles 4, into the pressure chambers 5. The several pressure chambers 5 are separated from one another by means of partitions 6 shown in Fig. 2.

The spring closure caps 7 comprise as many radially inwardly extending tongues as there are pressure chambers in the bearing. These tongues are carefully fitted to the extensions 25 of the partitions 6 so they can close the pressure chambers and thus, act as valves. The extremities of these tongues encircle the cylindrical surface of the movable body or shaft so as to be spaced therefrom by a very small distance only, for example, by no more than from about 0.01 to about 0.03 mm. depending on the fluid pressure being high or low.

The mode of operation of these tongues 8 is illustrated in Fig. 7. When the bearing is not under pressure the tongues occupy the position 8 which is that of a released or open spring closure. During normal operation, i. e. at times when the shaft is perfectly centered, the tongues occupy the slightly bent position indicated at $8_1$. When a force acts on the left side of the shaft, the shaft is somewhat displaced toward the right. Consequently, the slot-like opening at the left is enlarged in proportion to the displacement of the movable body 1, while the opening at the right is reduced correspondingly. Consequently, an increased quantity of fluid escapes from the pressure chamber at the left, with the result that the pressure in this chamber drops. The tongue tends to leave the position $8_1$ and to return to its initial position 8 so as to further widen the opening at the left, and thus further reduce the pressure in the pressure chambers at the left. The opposite effect is observed at the right where the pressure in the chamber rises owing to the reduction of the slot-like discharge outlet. On this side of the bearing, the resilient tongue will occupy the portion 8₂. Manifestly, the increased pressure on the right, and the reduced pressure on the left, have the desired result of displacing the movable body in a direction opposite to that caused by the force acting on the left side of the body, thus returning the body to its original, well centered position. The resilient tongues return to their initial position 8; they act like valves and respond to the slightest displacement of the movable body 1.

Figs. 3 and 4 illustrate a thrust-bearing comprising the same elements as the bearing described with reference to Figs. 1 and 2. In this embodiment of the invention, the injection ports for the fluid are provided in the form of bores traversing the shoulder-plate 9 of the movable body 1.

The surface of the shoulder, or the effective area of abutment, of course, is a function of the weight of the movable body, if its position is vertical, or of the axial thrust if its position is horizontal. This surface or area also depends upon the pressure of the supporting fluid.

Figs. 5 and 6 illustrate a swivel bearing of the type employed in certain gyroscopes. A plan view of the springy cover is shown in one part of Fig. 2 as well as in Fig. 6.

The invention lends itself particularly well to bearings of the kind wherein the usual relation of the parts is reversed, and the part which is usually the stationary bearing, is arranged to revolve about a staionary shaft.

This embodiment of the invention is shown in Figs. 8 and 9. The stationary shaft comprises portions 10 and 11; portion 10 is provided with bores 12 and 13 leading to a groove 14, while portion 11 has narrow bores 15 associated with pressure chambers 16 which are separated from one another by partitions 17. The rotary body 18 is mounted for free rotary displacement on the fixed shaft 10, 11. The inner wall of the cylindrical bore of the body 18 "bears" on the partitions 17. A pair of annular springcovers 20 mounted on the portion 10, have radial notches so as to form resilient tongues 22.

The invention involves important advantages in that it provides simple, space saving means which nevertheless, respond instantaneously to the slightest decentering of the movable body. The partitions separating the pressure chambers and tongues are quite thin so as to leave a maximum of space to be occupied by the chambers. Thus it is possible to increase the number of pressure chambers and to enlarge the supporting surface, with the result that the operation of the fluid support bearing is materially enhanced.

The invention succeeds in providing bearings which function normally under a pressure as low as 0.2 atmosphere.

Inasmuch as all contact between the shaft and the bearing is eliminated, there exists absolutely no occasion for wear. Thus the bearing may be made of pressure-molded material, at a very much reduced cost.

The fluid employed depends on the particular requirements; air, petroleum, refrigerant liquids, or oil of very low viscosity may be used, for example.

I claim:

1. A fluid support bearing comprising in combination, a stationary member, a member arranged for rotary displacement relative to said stationary member, a plurality of pressure chambers arranged along the periphery of one of said members in proximity to the other member, means for supplying a fluid under pressure to said chambers, and closure means permitting the discharge of the fluid comprising resilient elements arranged at the axial extremities of said pressure chambers and adapted to vary the effective area of the discharge openings in response to the pressure prevailing in correlated ones of said pressure chambers.

2. A fluid support bearing comprising in combination, a stationary member, a member arranged for rotary displacement relative to said stationary member, a plurality of pressure chambers arranged along the periphery of one of said members in proximity to the other member, means for supplying a fluid under pressure to said chambers, and fluid discharge controlling means including resilient tongues arranged at the axial extremities of said pressure chambers, each tongue being adapted to control the discharge of fluid from one of said chambers, said tongues being adapted to vary the effective area of the discharge openings in response to the respective pressures prevailing in the pressure chambers correlated therewith.

3. A fluid support bearing comprising in combination, a stationary member, a member arranged for rotary displacement relative to said stationary member, a plurality of pressure chambers arranged along the periphery of one of said members in proximity to the other member, means for supplying a fluid under pressure to said chambers, and circular closure members including resilient tongues mounted at the axial extremities of said pressure chambers, each tongue being correlated with one of said chambers and adapted to bend in response to variations in the pressure prevailing in the correlated chamber so as to vary the effective discharge opening for the fluid escaping from said chamber, said tongues normally being arranged inclined toward the interior of said chambers.

4. A fluid support bearing comprising in combination, a stationary member, a member arranged for rotary displacement relative to said stationary member, a plurality of pressure chambers arranged along the periphery of one of said members in proximity to the other member, means for supplying a fluid under pressure to said chambers, and circular closure members including resilient tongues mounted at the axial extremities of said pressure chambers, each tongue being correlated with one of said chambers and adapted to bend in response to variations in the pressure prevailing in the correlated chamber so as to vary the effective discharge opening for the fluid escaping from said chamber, and partitions separating said pressure chambers, said partitions being arranged to separate also said resilient tongues.

5. A fluid support bearing comprising in combination, a stationary member, a member arranged for rotary displacement relative to said stationary member, a plurality of pressure chambers arranged along the periphery of one of said members in proximity to the other member, means for supplying a fluid under pressure to said chambers, and circular closure members including resilient tongues mounted at the axial extremities of said pressure chambers, each being correlated with one of said chambers and adapted to bend in response to variations in the pressure prevailing in the correlated chamber so as to vary the effective discharge opening for the fluid escaping from said chamber, said circular closure members being mounted on said stationary member.

6. A fluid support bearing comprising in combination, a stationary bearing member, a shaft arranged for rotation in said member, a plurality of pressure chambers arranged along the periphery of said shaft, means for supplying fluid under pressure to said chambers, and fluid discharge control means comprising circular closure members mounted on said bearing member and surrounding the shaft at the axial extremities of said chambers, said closure members comprising resilient tongues adapted to bend in response to variations in the pressure prevailing in correlated pressure chambers so as to be spaced by varying distances from the circumference of said shaft whereby the effective discharge opening for each pressure chamber is varied in response to the pressure prevailing therein.

7. A fluid support bearing comprising in combination, a stationary shaft, a member arranged for rotary displacement on said shaft, a plurality of pressure chambers arranged along the periphery of said shaft, means for supplying fluid under pressure to said chambers, said means including narrow bores leading into said chambers, and annular closure members mounted on said shaft at the axial extremities of said chambers, said closure members including resilient tongues each correlated with one of said chambers and adapted to vary in response to variations in the pressure prevailing in the correlated chamber, the effective discharge opening for fluid escaping from said chamber, between said shaft and said rotary member.

8. A fluid support thrust or swivel type bearing comprising in combination, a stationary bearing member, a shaft arranged for rotation relative to said member, a plurality of pressure chambers arranged along the periphery of a portion of said shaft, means for supplying fluid under pressure to said chambers, and a circular closure member mounted on the bearing member so as to surround said shaft portion at the axial extremity of the pressure chambers remote from the bearing supported extremity of the shaft, said closure member comprising resilient tongues each correlated with one of said chambers and adapted to vary in response to variations in the pressures prevailing in the correlated chamber, the effective discharge opening for fluid escaping from said chamber, between said bearing and said shaft portion.

References Cited in the file of this patent

UNITED STATES PATENTS

| Number | Name | Date |
|---|---|---|
| 2,049,343 | Warren | July 28, 1936 |
| 2,498,011 | Sherbondy | Feb. 21, 1950 |
| 2,502,173 | Potts | Mar. 28, 1950 |
| 2,578,713 | Martellotti | Dec. 18, 1951 |